April 11, 1961 A. A. SUGALSKI ET AL 2,979,207
HIGH TEMPERATURE ANALYTICAL FILTER
Filed Feb. 11, 1959 2 Sheets-Sheet 1

INVENTORS
ALFRED A. SUGALSKI
SHERMAN L. WILLIAMS
WILFRED F. MATHEWSON JR
BY

ATTORNEY

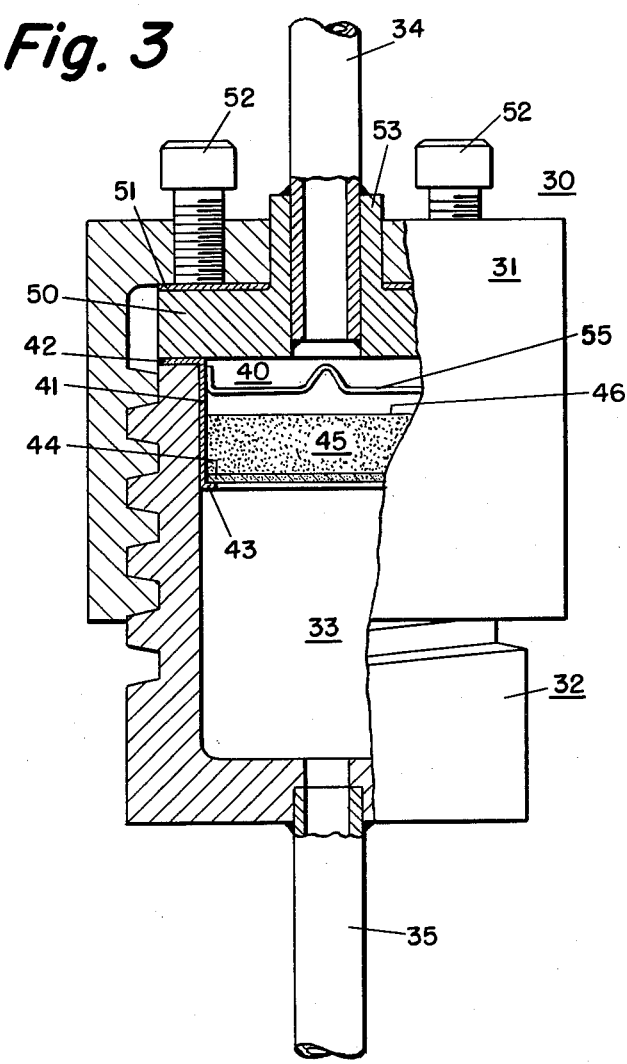

United States Patent Office 2,979,207
Patented Apr. 11, 1961

2,979,207

HIGH TEMPERATURE ANALYTICAL FILTER

Alfred A. Sugalski, Scotia, Sherman L. Williams, Elnora, and Wilfred F. Mathewson, Jr., Ithaca, N.Y., assignors, by mesne assignments, to the United States of America as represented by the Secretary of the Navy Filed Feb. 11, 1959, Ser. No. 792,680

1 Claim. (Cl. 210—193)

This invention relates to filtering apparatus and more particularly to analytical filters for use in the quantitative separation of solubles and insolubles from liquids at high temperatures.

The solubility of most materials is greatly affected by temperature and numerous materials require extremely high temperatures to place them in a soluble state. Since analytical determinations of separated materials are conveniently and conventionally performed under atmospheric conditions it is usually necessary after separation of the solubles from the insolubles under high temperature conditions to cool down the separation vessel before the separated products can be analyzed.

One object of the invention is to provide an apparatus which is adapted for carrying out a filtering operation at high temperatures but which is easily disassembled to permit ready access thereto for examination of the separated products.

Another object is to provide such an apparatus for carrying out filtering operations under pressure.

Another object is to compactly arrange the filtration media within a filtration chamber in a manner to provide ready accessibility for analysis of the filtered products.

Another object is to provide a high efficiency filtering unit utilizing a precoat material adapted for the quantitative separation of solubles and insolubles.

By the present invention a highly efficient filtering operation may be accomplished by the utilization of a precoat material which permits the quantitative separation of solubles and insolubles under high temperature conditions. The filtering apparatus is so designed that the precoat material is maintained on a support within the filtering apparatus in the path of the filtration liquid passing through the apparatus and the support and precoat material are arranged to be removed readily from the filtering apparatus in order to provide access thereto for examination of the filtered material. Samples of the non-filterable solids content may, of course, be taken downstream of the precoat material for analysis without removal of the precoat and its support.

The particular precoat material to be used for a filtering operation is required to be insoluble and stable in the filtration liquid and at the temperature of the filtering operation and also be capable of permitting the filtration product to be removed either by ashing or being dissolved in another fluid which will not affect the filtration product.

The support for the precoat material is preferably in the form of a porous filter disc constructed of a material which will introduce little if any of the filtration product or material which is to be measured. The support is also required to be insoluble and stable in the filtration liquid and under the high temperature conditions of the filtration operation and yet it must have a degree of porosity sufficient to pass liquid at the desired rate and pressure drop but insufficient to allow any significant amounts of the precoat material to pass through or become entrapped in the pores of the support. The porous filter disc will preferably be formed of sintered stainless steel perforated to have the desired degree of porosity.

In the drawings,

Fig. 3 is a view in partial sectional elevation of another form of apparatus.

Figure 1:
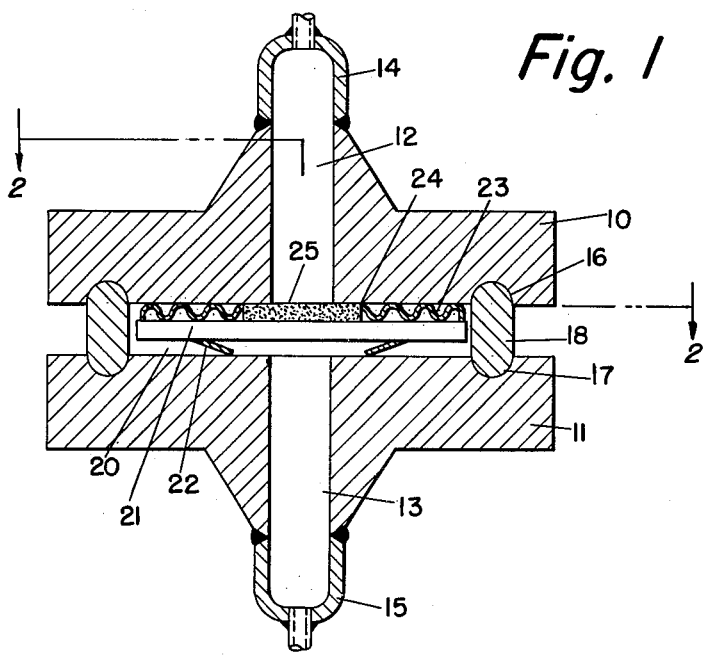
Fig. 1 is a view in sectional elevation of one form of filtering apparatus.
Figure 2:
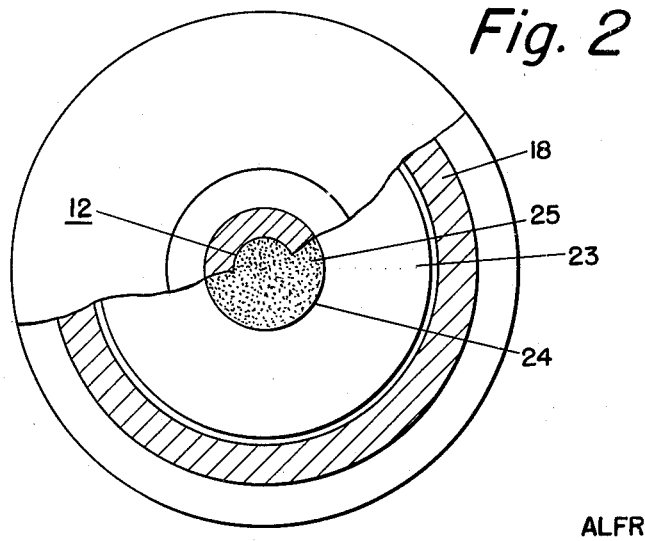
Fig. 2 is a view taken in the irregular line 2—2 of Fig. 1 to show details of the apparatus.

As shown in Fig. 1 the filtering apparatus is formed of upper and lower housing sections 10 and 11, each of which is preferably annular in shape as shown in Fig. 2 and is provided with a central confined elongate passageway shown at 12 in the upper section and 13 in the lower section. In this embodiment the sections are of substantial thickness to provide elongate vertical passageways with surrounding outer flanges but may be otherwise constructed in order to provide an inner compartment. The lower section 11 may be suitably braced or supported to maintain both sections vertically disposed and in superposed relationship while the upper section is provided with an inlet end 14 and the lower section is provided with an outlet end 15. The passageways 12 and 13 are preferably cylindrical and of any suitable or desired diameter and together form a compartment through which a mixture passes during a filtering operation. The inner face of the upper section is provided with an annular groove 16 and the lower section is provided with a similar and mating groove 17 between which is positioned an annular spacing gasket 18 which is of suitable height to provide a central chamber 20 of desired size to receive filtering elements as later explained.

The chamber 20 formed by the gasket 18 will be in effect sealed thereby and the inlet 14 and outlet 15 will be suitably valved to provide controls for the passage of a mixture containing solubles and insolubles therethrough under desired operating pressures.

The chamber 20 is designed to compactly receive the particular filtering elements used in the filtering operation and to maintain them in desired positional relationship during an operation but also permit their removal when it is desired. The filtering elements consist of a flat porous filter disc 21 which is disposed generally centrally of the chamber 20 by spring means 22 preferably of the Belleville type which is conical in shape and reposes on the inner face of the lower section 11. An annular corrugated gasket 23 is disposed on the upper face of the porous disc 21 and is maintained generally rigid by the weight of the upper section 10 and the upward bias of spring 22. The gasket 23 provides a central space 24 which receives a suitable precoat material 25. The precoat material 25 is thus disposed centrally of the passageways 12 and 13 and in the path of the mixture passing between the passageways.

The described apparatus is fabricated from stainless steel but may be made from other suitable materials which will resist high temperatures. For example, in the measurement of the solubility of iron and manganese in water, the internal surfaces of the vessel sections 10 and 11, the ring gasket and spring may be plated with nickel to prevent release of corrosion products from these members.

Preferably, the precoat material 25 will be a high purity ashable material such as graphite which, for example, is suitable for separating corrosion products for analytical determinations of the soluble and insoluble portions in water systems of high temperature steam power plants or cooling systems of nuclear power plants.

In Fig. 3 the apparatus is generally like that described in connection with Figs. 1 and 2 but differs therefrom in its details of construction. The assembled apparatus is indicated at 30 and like the first described modification is made up of upper and lower sections which, in Fig. 3, are indicated by numerals 31 and 32. The upper and lower sections when assembled provide a central compartment 33 through which the liquid passes from the upper inlet 34 to the lower outlet 35. The upper section 31 is internally threaded while the lower section 32 is externally threaded permitting the sections to be readily assembled and disassembled.

A cup-shaped element or sub-assembly indicated at 40 is mounted at the upper end of the compartment 33. The element 40 has a cylindrical vertical side wall 41 which is provided with an outer flange 42 for being received by the upper edge of the lower section 32 and has a lower inner flange 43 for receiving a flat porous disc 44 for supporting the precoat material which is indicated at 45 and may, for example, extend to the level indicated by the line 46.

A gland 50 is mounted on the outer flange 42 of the cup-shaped member 40 while a washer 51 is positioned between the gland and the upper end of section 31 to provide a sealed arrangement for these elements which is maintained by means of pressure bolts 52 which are screw-threadedly mounted in the upper end of section 31. As shown, the gland 50 is provided with a hollow extension 53 which extends through an opening in the upper end of section 31 and receives the inlet conduit 34 and is preferably sealed therewith by welding, as shown, while the outer conduit 35 is welded in sealing engagement with the end of lower section 32, as shown. For convenience in removing the precoat material a bail or handle 55 is secured to the cup-shaped member 40 and permits ready removal of the precoat material and separated products following a filtering operation and after the upper section 31 of the assembly is removed from the lower section 32.

What is claimed is:

Filtering apparatus which provides a pressure-tight filtering chamber and permits ready access thereto, said apparatus comprising complemental sections, each section being generally similarly constructed with a central passageway extending therethrough and normal to a flat surface, said sections being disposed in horizontal superposed relation with their flat surfaces opposing each other, an annular groove in each flat surface in opposed relationship and having a common diameter, an annular gasket having its upper edge in the upper groove and its lower edge in the lower groove, said gasket spacing said sections and forming a central cylindrical compartment in communication with said passageways, a filter disc disposed horizontally of and extending substantially across said central compartment, a corrugated gasket supported by the filter disc and having a central aperture providing a pocket between and aligned with said central passageways, conical spring means between the inner surface of the lower section and the filter disc to permit uninterrupted passage of fluid between the passageways and a precoat medium within said pocket for ready inspection when the upper section is removed.

References Cited in the file of this patent

UNITED STATES PATENTS

| | | |
|---|---|---|
| 854,288 | Goreau | May 21, 1907 |
| 1,680,323 | Culver | Aug. 14, 1928 |
| 2,306,984 | Tolman | Dec. 29, 1942 |
| 2,879,207 | Poitras | Mar. 24, 1959 |